United States Patent [19]

Hoffmann et al.

[11] 4,270,889
[45] Jun. 2, 1981

[54] EQUIPMENT FOR THE CONTINUOUS PRODUCTION OF FOAM BOARDS

[75] Inventors: Erwin Hoffmann, Leverkusen; Kurt Krippl, Monheim; Karl J. Kraft, Leverkusen; Gerd Gabrysch, Odenthal-Neschen; Frank Redmer, Leverkusen, all of Fed. Rep. of Germany

[73] Assignee: Bayer Aktiengesellschaft, Leverkusen, Fed. Rep. of Germany

[21] Appl. No.: 86,105

[22] Filed: Oct. 18, 1979

[30] Foreign Application Priority Data

Jun. 15, 1979 [DE] Fed. Rep. of Germany ....... 2924185

[51] Int. Cl.³ .............................................. B29D 27/04
[52] U.S. Cl. ................................... 425/115; 264/45.8; 264/46.3; 264/54; 264/216; 425/224; 425/817 C
[58] Field of Search ............. 425/4 C, 224, 817 C, 425/115; 264/54, 46.2, DIG. 84, 45.8, 46.2, 46.3, 49, 50, 54, 216, 217

[56] References Cited

U.S. PATENT DOCUMENTS

| | | | |
|---|---|---|---|
| 2,271,058 | 1/1942 | Binns | 264/46.3 X |
| 2,615,271 | 10/1952 | Ulmer et al. | 264/216 X |
| 2,712,154 | 7/1955 | Lindquist | 264/49 X |
| 2,957,207 | 10/1960 | Roop et al. | 264/54 |
| 3,046,177 | 7/1962 | Hankins | 264/46.3 X |
| 3,047,449 | 7/1962 | Coble | 264/54 X |
| 3,071,180 | 1/1963 | Finger et al. | 264/216 X |
| 3,216,849 | 11/1965 | Jacobs | 264/54 X |
| 3,377,652 | 4/1968 | Politzer et al. | 264/49 X |
| 3,453,168 | 7/1969 | Edwards et al. | 425/4 C X |
| 3,553,300 | 1/1971 | Buff | 264/DIG. 84 |
| 3,562,767 | 2/1971 | Mallet et al. | 425/4 C |
| 3,775,522 | 11/1973 | Auge | 425/4 C X |
| 3,841,811 | 10/1974 | Peille | 425/817 C X |
| 3,880,559 | 4/1975 | Peille | 425/224 X |
| 4,108,585 | 8/1978 | Proksa et al. | 264/DIG. 84 |

FOREIGN PATENT DOCUMENTS 58 12/1978 European Pat. Off. ......... 264/DIG. 84

*Primary Examiner*—Philip Anderson
*Attorney, Agent, or Firm*—Gene Harsh; Joseph C. Gil; R. Brent Olson

[57] ABSTRACT

The invention relates to equipment for the continuous production of foam boards, which may be laminated between facings, from a liquid foamable reaction mixture. The apparatus broadly comprises a conveyor, a foam mixture application device located at or near one end of the conveyor and a transverse foam mixture distribution device located downstream of said application device and above said conveyor, the space between said distribution device and said conveyor being adjustable.

8 Claims, 4 Drawing Figures

EQUIPMENT FOR THE CONTINUOUS PRODUCTION OF FOAM BOARDS

BACKGROUND OF THE INVENTION

Equipment is known for the production of foam buns or sandwich boards which consist of a foam core between facings. In the latter case, a so-called double conveyor is used, consisting of a lower and upper conveyor belt. In the case of bun production, the forming foam can rise freely and may be leveled from the top to avoid bulging. In the case of sandwich board production, the two conveyors exert pressure on the forming foam.

A problem which has not yet been satisfactorily solved is the uniform distribution of the reaction mixture in the advance direction and particularly in the transverse direction.

One of the most commonly used application methods is the use of a mixhead which continuously moves from left to right in a line sequence. This method, however, causes the material to accumulate at the edges. The oscillating movement of the mixhead results in high impacts on the turning points. Because of the high velocity involved, these impacts create wear and tear and cause the material to splash. At high manufacturing velocities, the additional problem occurs that the distance between the zigzag lines of the applied mixture becomes too wide.

The use of an inclined table is also well known in the art. It has the advantage that the reaction mixture flowing from the mixhead meets the application surface more gently due to the angle of the inclination. The mixture already partially distributes itself over the operation width on the table. With wider operation width, several parallel mounted mixheads have been used. However, difficulties have been encountered where the individual flows intermix during spreading. Cellular striation and bubbles form in the finished part.

Attempts have been made to level the applied mixture with a rake or a roller by forming a space with the conveyor. This becomes a problem when the space has a wide width. It was found that the transverse distribution does not take place fast enough and that the reaction mixture begins to foam on the edges before the mixture passes the space. This causes non-homogeneous edge zones in structure as well as in density. For this reason, too, the processing of highly reactive systems presents considerable problems.

Therefore, in the continuous production of continuous foam buns and particularly in the production of foam boards or sandwich boards having a foam core, the problem must be solved of improving the mixture distribution over the operation width to such a degree that a satisfactory homogeneity of the finished part is obtained. In doing this, the length of the pouring end or the total length of the equipment should be as short as possible.

DESCRIPTION OF THE INVENTION

Figure 1:
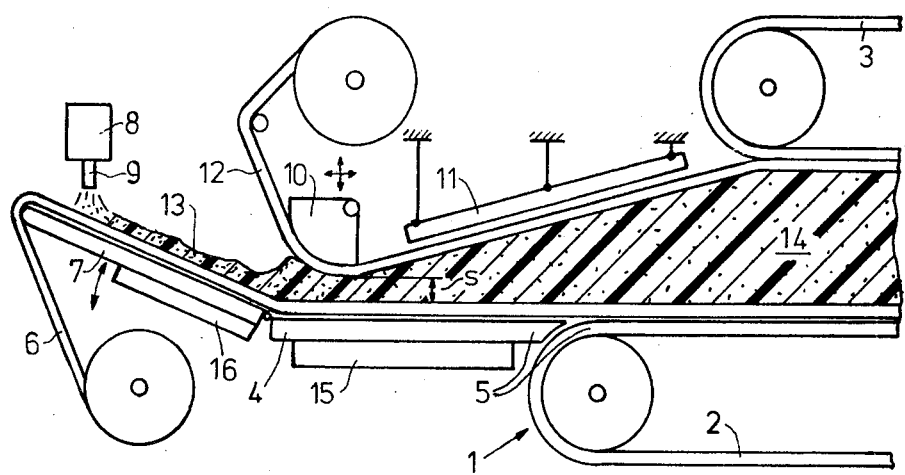
FIG. 1 shows a side view of the equipment of the present invention.

The above-noted problems have been solved by the relatively simple expedient of varying the height of the space over the operation width of the equipment. More particularly, the invention relates to an apparatus comprising a conveyor, a foam mixture application device located at or near one end of the conveyor and a transverse foam mixture distribution device located downstream of said application device and above said conveyor, the space between said distribution device and said conveyor varying over the width of the apparatus.

This expedient allows the largest accumulation of reaction mixture ahead of the distribution device, thereby holding the mixture in place for a longer time. The reaction mixture is therefore pushed from this area toward the sides, where the space is higher. Although the space height is not equally high over the entire operation width of the apparatus, this arrangement surprisingly results in a good transverse distribution and uniform layer thickness, which is the prerequisite for a good finished product.

Preferably, the height of the space is smallest in an imagined horizontal plane extending through the flow-out of the application device in the advance direction and increases toward the sides. (In other words, the height is preferably lowest in the middle of the apparatus.) The accumulation is the greatest in this imagined plane ahead of the transverse distribution device and is thus deflected toward the sides.

According to one embodiment of the instant invention, the transverse distribution device is a skid, whose flexible outer surface, over the entire operation width, is supported with several adjusting screws on a bar of the transverse distribution device.

Alternatively or simultaneously, the conveyor surface in the area of the transverse distribution device is a glide table, whose flexible surface over the entire operation width is supported by several adjusting screws on a bar. The adjusting screws preferably have a thread with a small lead, so that an adjustability up to one tenth of a millimeter can be performed with corresponding accuracy. To adjust the space height, spacers are for example used, machined to the respective size, and are inserted into the space. Measuring devices may also be used.

A roller may be used with a diameter which is sectionally adjustable. This, for example, can be accomplished by wrapping corresponding sections of the roller, whereby the space becomes smaller; or by providing an elongatable surface cover for the roller. Alternatively, several chambers can be formed in the roller, which can be inflated or which are provided with expanding elements.

It is understood that the transverse distribution device is adjustable in height and that it preferably is also adjustable in the advance direction in order to be moved to a desired distance from the application device. If the operation surface of the glide table is supported by spacers, this section of the glide table should be longitudinally movable together with the distribution device.

On equipment provided with an inclined table, the inventive distribution device can be arranged above the table or at the break point between the table and the conveyor.

Preferably, an additional leveling device is arranged behind the distribution device. This device consists, for example, of a chain apron, rollers, applied mats or the like.

For the production of a good product, it is recommended to cool the reaction mixture ahead of the transverse distribution device to 5°–18° C., preferably to 12°–18° C. and to apply temperatures of 30° to 100° C., preferably 25°–50° C. downstream of the transverse distribution device. In this manner, the reaction of the mixture is delayed ahead of the transverse distribution device but is accelerated behind it, so that the mixture is still a relatively thin liquid during the transverse distribution. In the production of sandwich boards having a foam core of 0.5 to 20 cm, and preferably 2 to 10 cm thickness, the production velocity is generally between 5 to 50 m per minute, and preferably between 8 and 25 m per minute.

According to another embodiment, the different width of the space is automatically adjustable depending on the values of a subsequently provided thickness and density measuring device. This, for example, occurs when the measured value is converted into an electric impulse, which is fed to a servomotor through an amplifier, which then correspondingly adjusts the respective adjusting screw.

Reference will now be made to the drawings.

According to FIG. 1, a double conveyor 1 consists of a lower conveyor 2 and an upper conveyor 3. A glide table 4 is provided ahead of the lower conveyor 2, which, together with the upper strand of the lower conveyor 2 forms the conveyor surfae 5 for a facing 6. The facing glides over an inclined table 7, above which a mixture application device 8 is arranged, which has a rigid outflow nozzle 9. Above the table 4 is a transverse distribution device 10, which is adjustable as to its height 5 above the conveyor as well as to its advance direction. Behind it is an additional leveling device 11. The upper facing 12 is guided underneath the distribution device 10. The applied foamable mixture is designated 13, the formed foam material with 14. A cooling device 16 may be provided underneath the application table 7, and a heating device 15 may be provided underneath the glide table 4.

The transverse distribution device 10 (FIG. 2) consists of a skid 17, which has a rigid bar. The operative surface 19 of the skid consists of a flexible metal sheet. This sheet is reinforced with a flexible bar 20, against which the adjusting screws 21 held in the bar are pressed. The adjusting screws 21 can be provided with measuring instruments 22 to indicate the deviation of the flexible bar 20 when adjusting the screws 21. The measurement instruments 22 are secured with their one ends to the rigid bar 18 and on their opposite ends they are provided with spring-biased pins, pressed against the screw heads and working on the indicating scale. Furtheron or alternatively said adjusting screws 21 may be combined via a servomotor to a computer, which is also combined to measurement instruments measuring the thickness of the finished product. These measurement instruments are combined via impulse transducers to the computer. The computer accelerates the servomotors if the thickness of the finished product deviates from the desired value.

Figure 3:
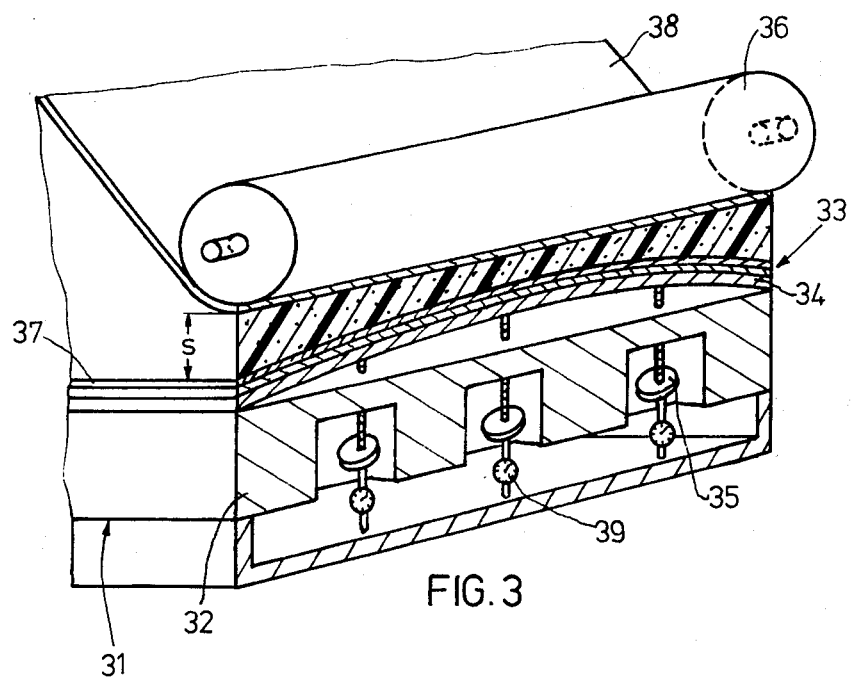
FIG. 3 shows a three-dimensional view of a glide table with devices to adjust the space height.

FIG. 3 shows a gliding table 31 with a rigid bar 32. The conveyor 33 consists of a flexible metal sheet, which is reinforced with a flexible bar 34. Adjusting screws 35 are mounted in the bar 32, which push against the flexible bar 34. A roller 36 is provided above the conveyor 33, which serves as upper limit of the space. The lower facing 37 glides on the conveyor 33 and the upper facing 38 is fed in below the roller 36. Measuring instruments, which are in contact with the adjusting screws 35 are designated 39.

Figure 4:
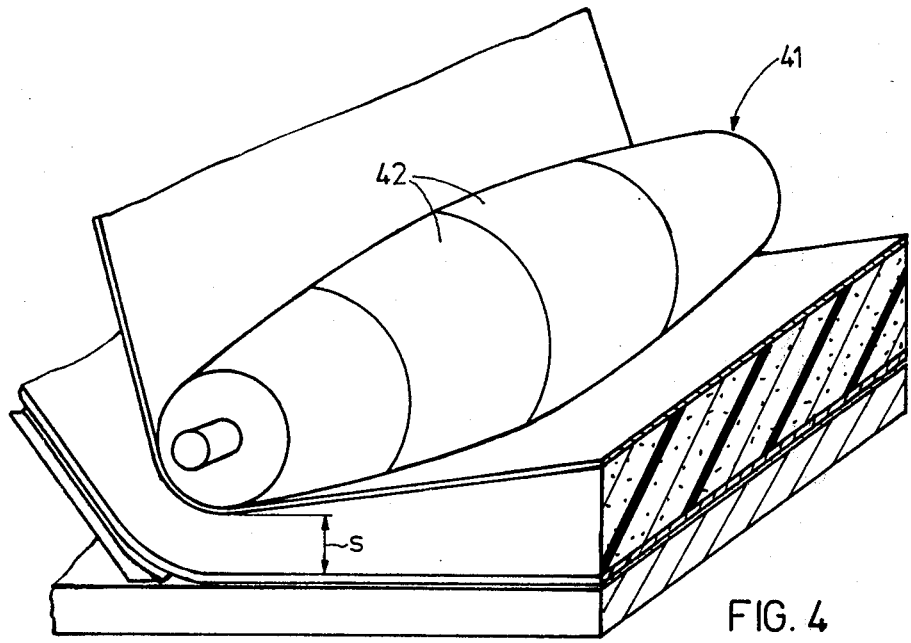
FIG. 4 shows a three-dimensional view of a covered roller useful as a distribution device.

The transverse distribution device 41 shown in FIG. 4 is designed as roller, which has exchangeable sectional bandages 42 to obtain the crown effect.

EXAMPLE

Figure 2:
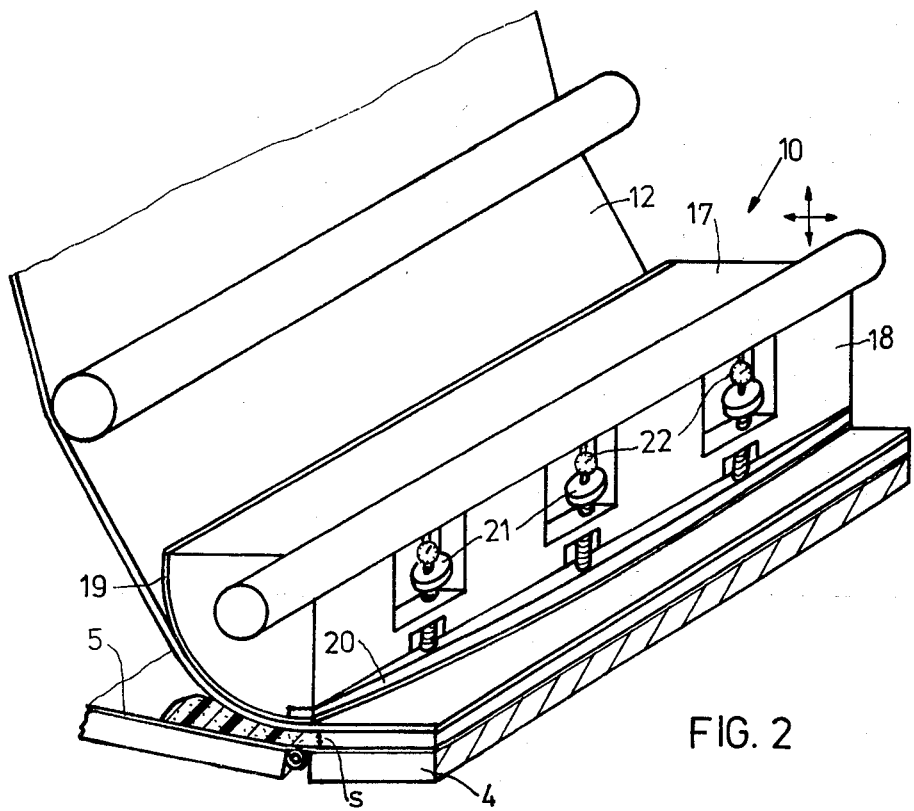
FIG. 2 shows an enlarged three-dimensional view of the space-forming area of the equipment of FIG. 1.

A double conveyor machine was used, which was manufactured by Maschinenfabrik Hennecke GmbH, St. Augustin 1, Federal Republic of Germany. It was equipped with a fixed mixhead. A flat glide table was provided ahead of the lower conveyor and an inclinable table was provided ahead of said glide table. Its surface was at the same level as the upper strand of the lower conveyor. A skid was used as transverse distribution device, as shown in FIG. 2.

The conveyor velocity was $10^m$/min. 14 l/min of reaction mixture was applied. The operating width was 1.25 m. Sandwich boards, having 0.1 mm thick paper facings on both sides of a rigid foam core, were to be produced. The total thickness of the boards was to be 40 mm. The table was cooled to 15° C. and the gliding table was heated to about 30° C.

The following reaction mixture was used:
40 pbw of a sucrose either with the OH number 520,
12 pbw of an ethylenediamine-started polyether with the OH number 480,
12 pbw glycerine,
1.8 pbw water,
1.5 pbw of a silicone stabilizer (type OS 710 by Bayer AG, Leverkusen, Fed. Rep. of Germany),
1.5 pbw dimethylcyclohexylamine,
45 pbw trifluorochloromethane,
201 pwb crude 4,4-diphenylmethanediisocyanate (Desmodur ® 44V20 by Bayer AG, Leverkusen).

The reaction time of this mixture was 120 seconds, 10 seconds of which were for the cream time, 20 seconds for the tack-free time, and 90 seconds for the curing time [defininitions according to "Kunstoffhandbuch" (Plastics Handbook) Volume VII, "Polyurethane" Vieweg and Hoechtlen, Carl-Hanser Publishing House, Munich, 1966].

Test 1

The mixture application point was 1.25 m ahead of the transverse distribution device. The leveling space had a uniform width of 145 mm. Completely unusable sandwich boards were produced, because the reaction mixture could only be spread to a width of 100 mm before it started to foam. The density was 30 kg/m³, the compressive strength 0.18 MPa.

Test 2

The same conditions existed as in Test 1 with the exception of adjustment of the leveling space. The maximum space height was (on the edges) 1.45 mm. In the center the space was 0.18 mm narrower, that is 1.27 mm high; at ¾ of the operation width it was each 0.07 mm narrower, that is 1.38 mm high. The finished product had perfectly formed edges and had a thickness of 39.6 mm on the left edge; at ¼, ½ and ¾ of the width it had a thickness of 40 mm; and the right edge had a thickness of 40.2 mm. The thickness tolerance is under 2%.

The compressive strength of the product was 0.28 MPa (which is considerably higher than in Test 1). The desity was 30 kg/m³.

What is claimed is:

1. An apparatus for the continuous production of foam boards, comprising (i) a conveyor, (ii) a foam mixture application device located at or near one end of the conveyor, and (iii) a transverse foam mixture distribution device located downstream of said application device and above said conveyor which is adapted to transversely distribute the foam mixture to form a uniformly thick layer, the space between said distribution device and said conveyor varying over the width of the apparatus and said distribution device extending the full width of the foam board to be produced.

2. The apparatus of claim 1, characterized in that the height of the space is lower toward the middle of the distribution device than at the edges.

3. The apparatus of claim 1, characterized in that the transverse distribution device is a skid, having a distendable flexible outer surface member, and wherein the flexible outer surface member is supported by several adjusting screws.

4. The apparatus of claim 1, characterized in that the conveyor surface in the area of the transverse distribution device is a gliding table having a distendable flexible outer surface member, and wherein the flexible surface member is supported by several adjusting screws.

5. The apparatus of claim 4, characterized in that measuring means are provided for indicating the displacement of the adjusting screws.

6. The apparatus of claim 1, characterized in that the transverse distribution device is a roller, whose outside diameter is varied.

7. The apparatus of claim 1, characterized in that a leveling device is provided downstream of the transverse distribution device.

8. The apparatus of claim 1, characterized in that means is provided to vary the height of the space and said means is adapted to be automatically adjusted depending on the values of a downstream thickness and density measuring device.

* * * * *